United States Patent Office 3,620,172
Patented Nov. 16, 1971

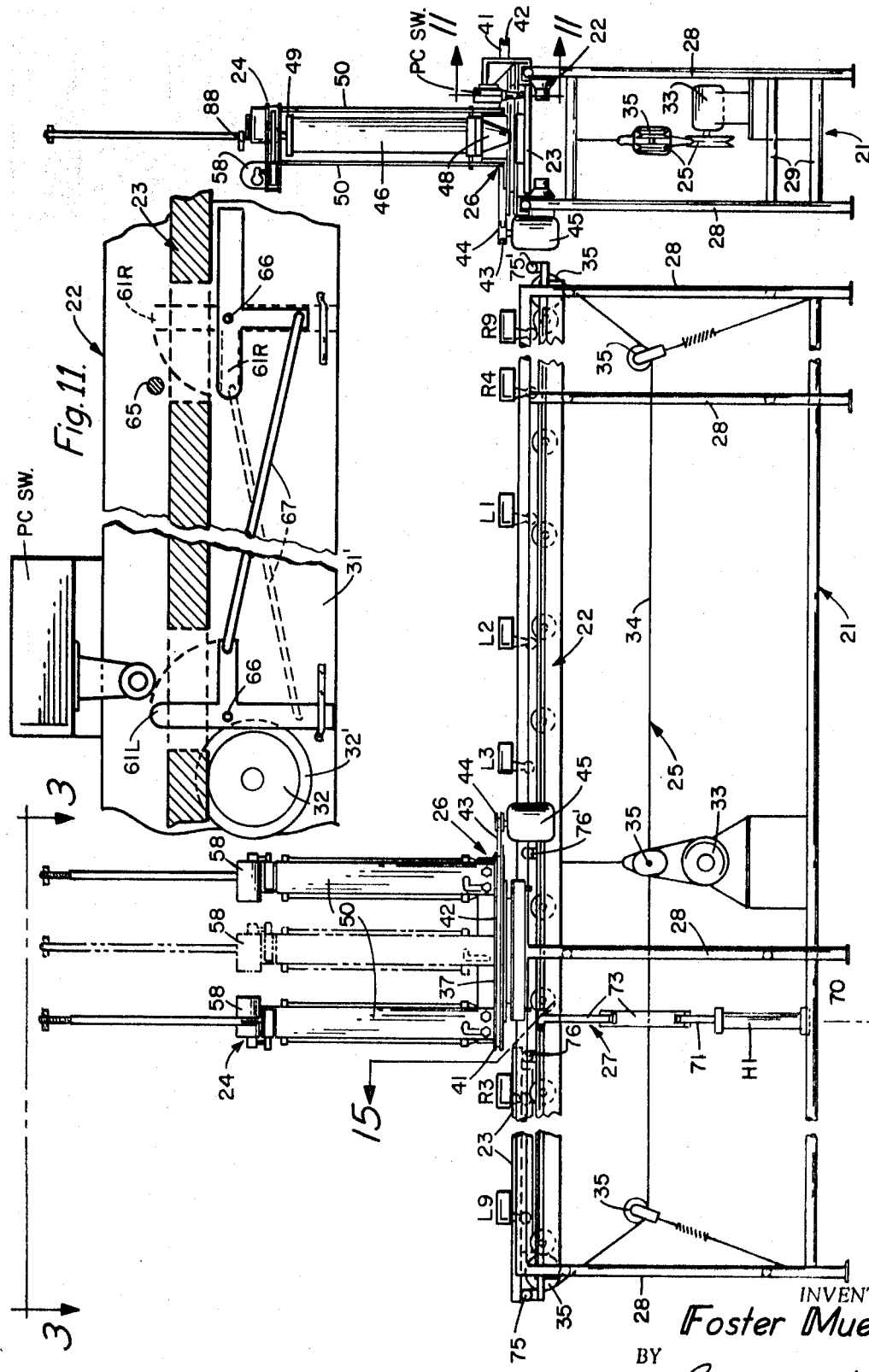

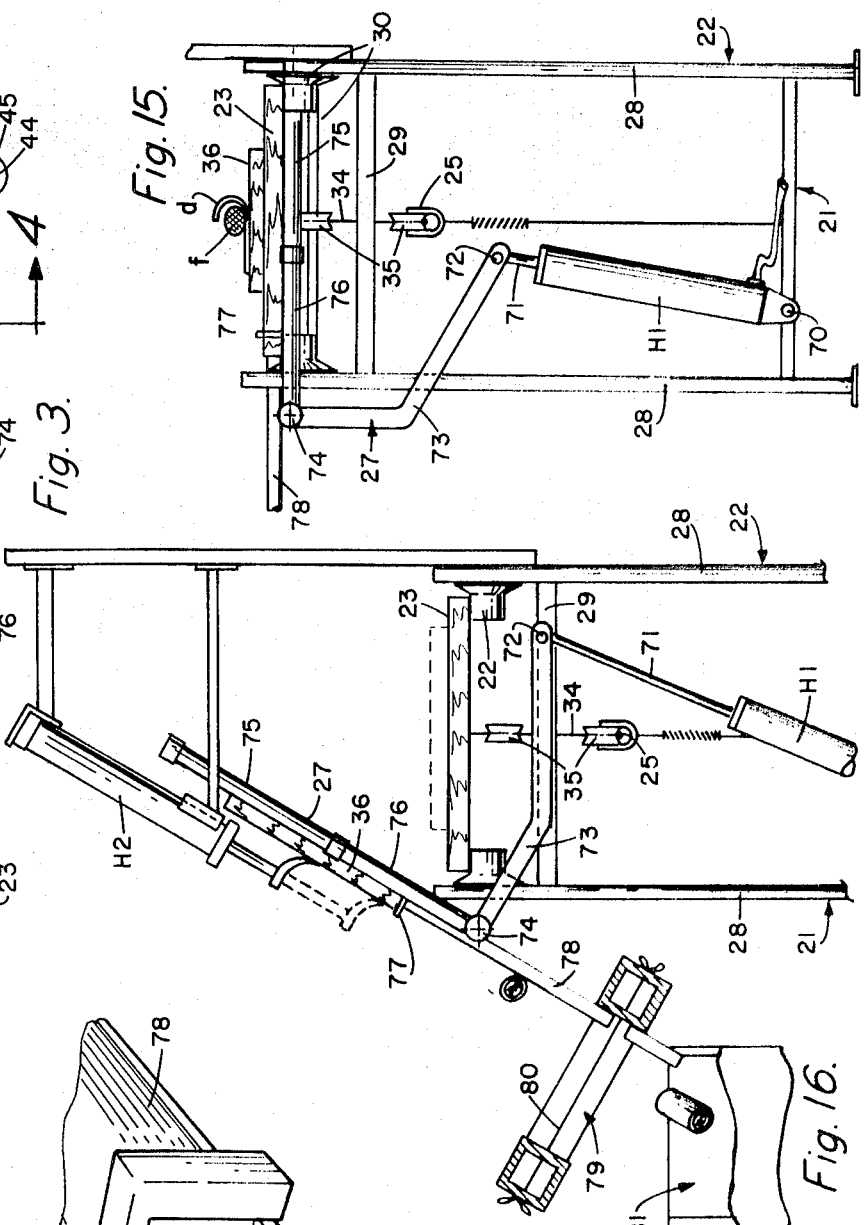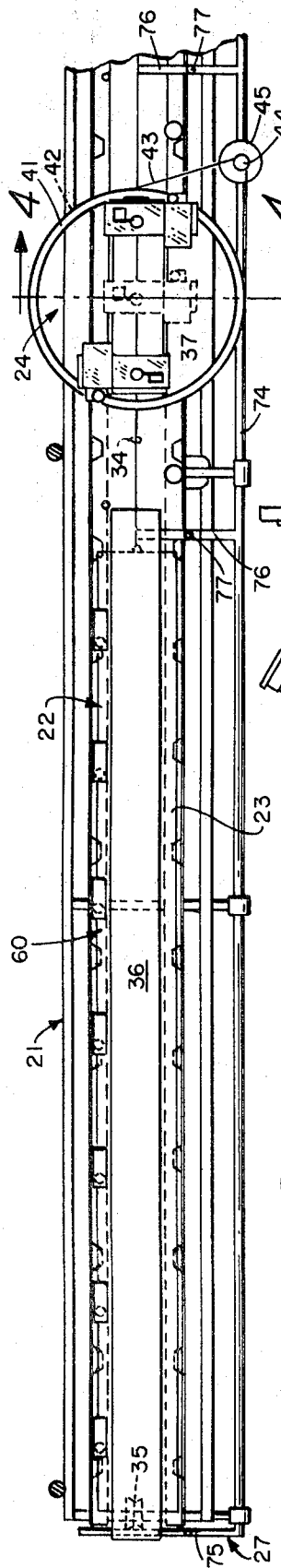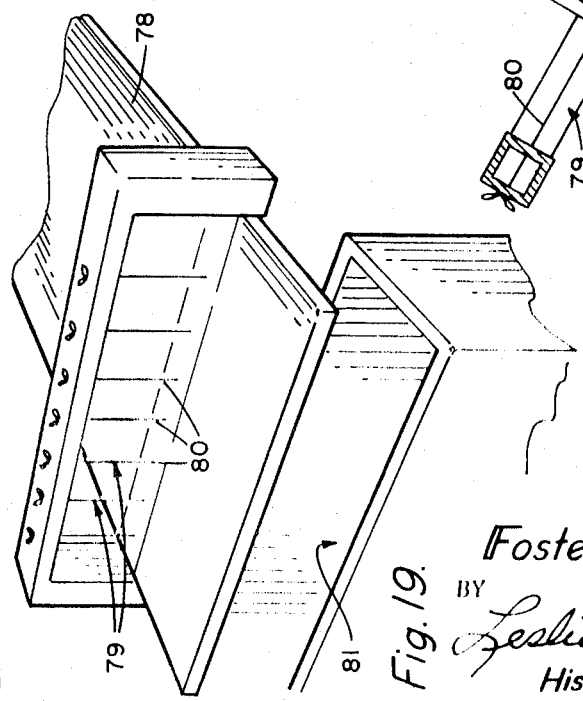

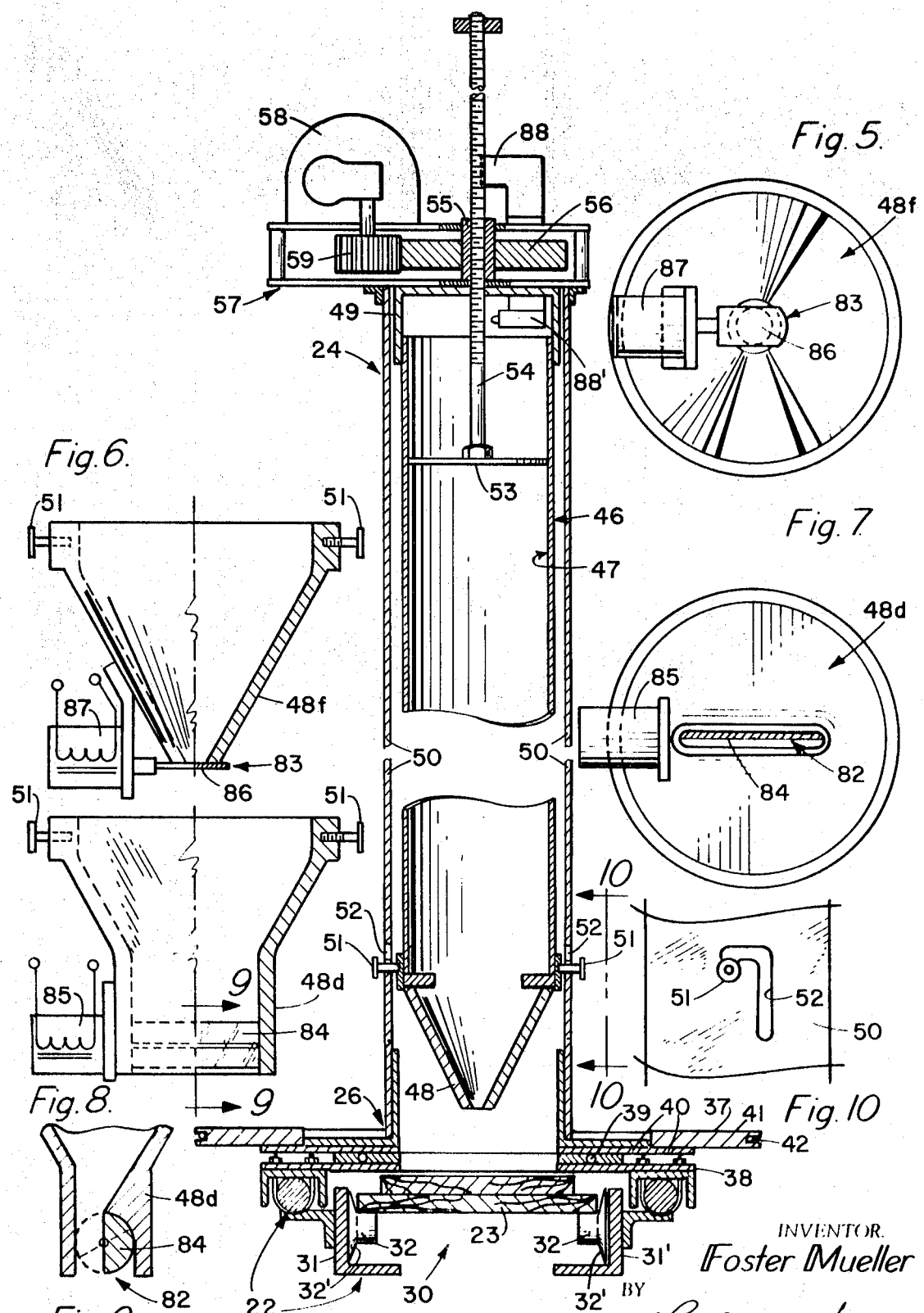

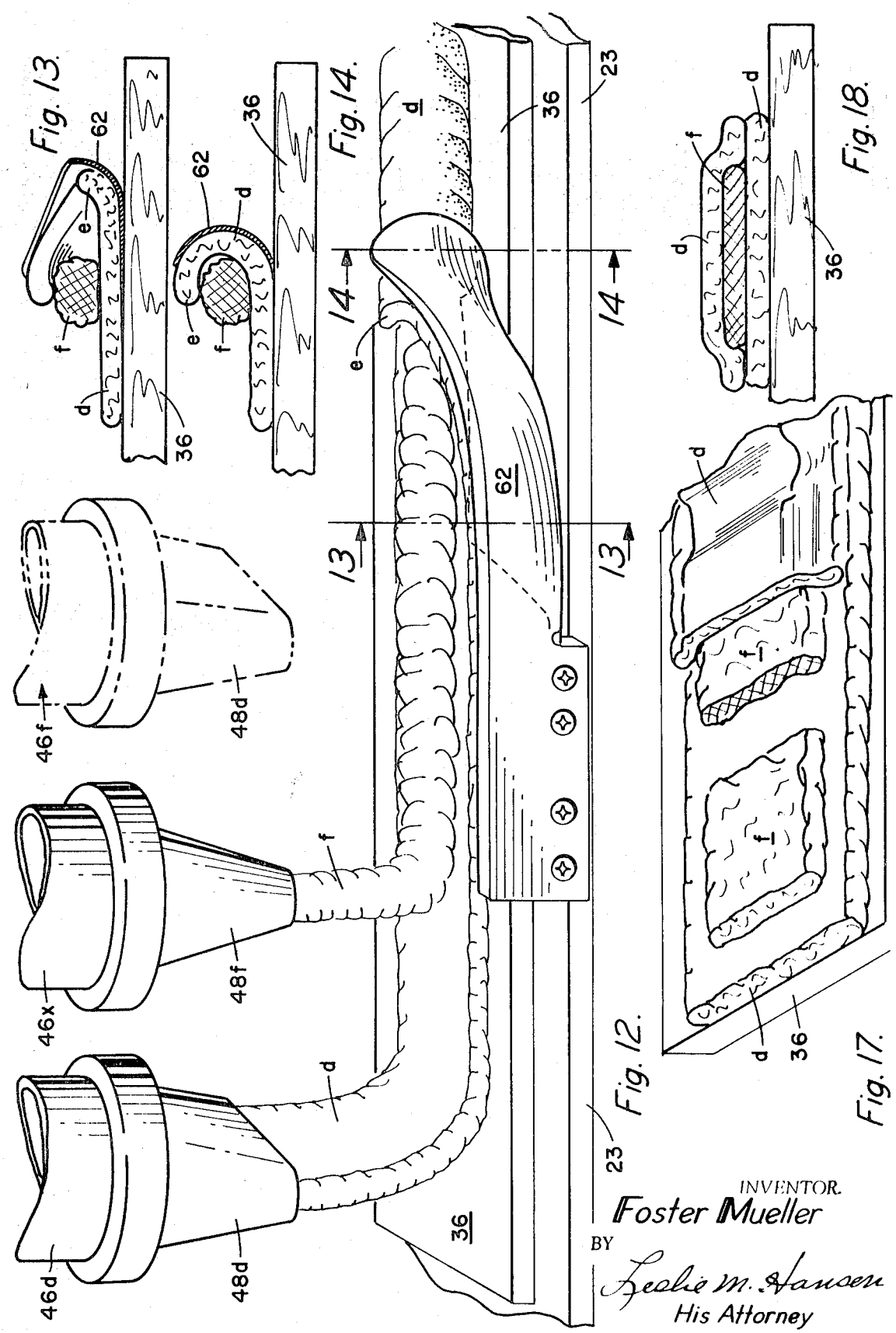

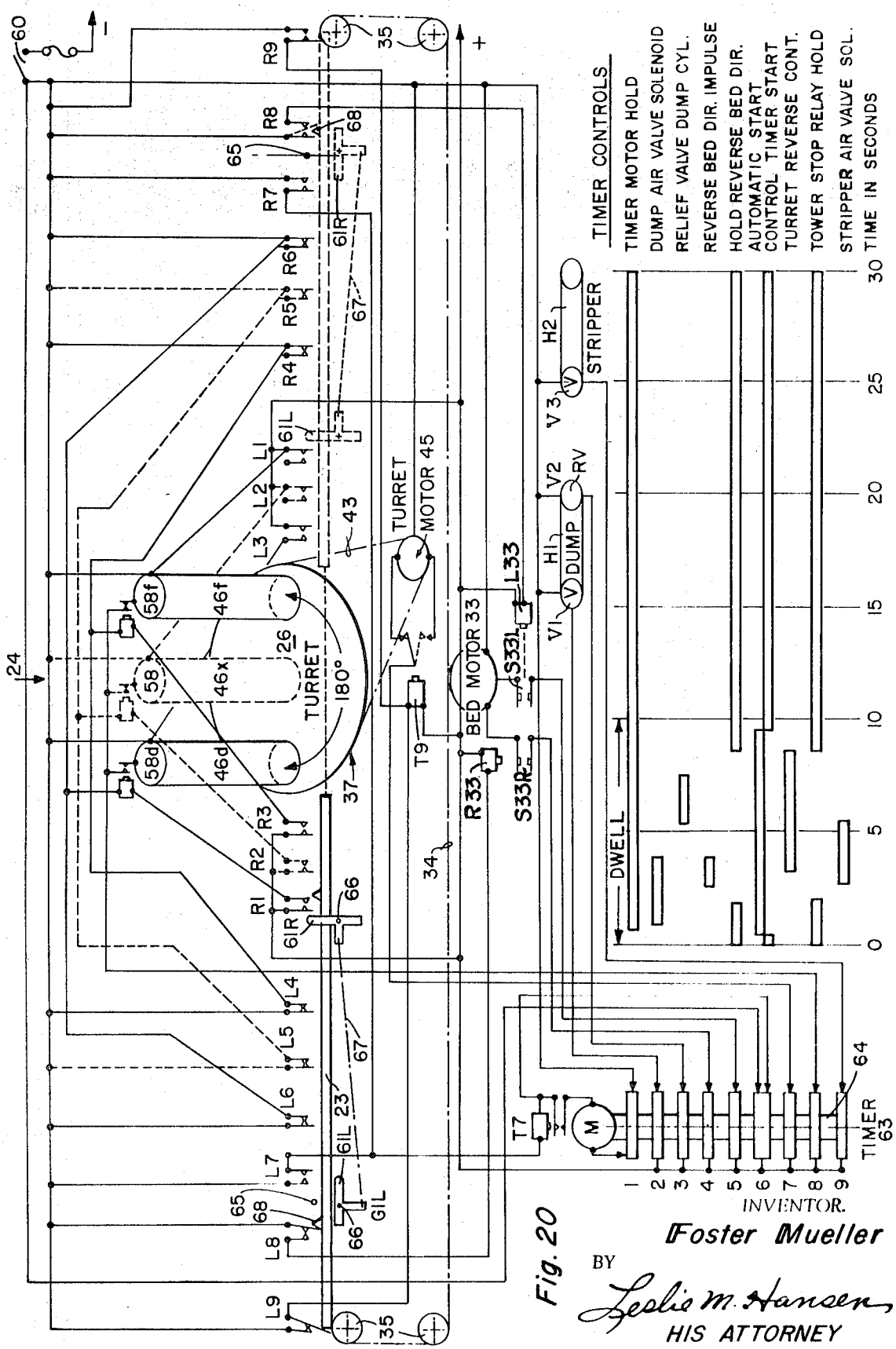

3,620,172
FOOD FABRICATOR
Foster Mueller, Mercedes, Tex.
(614 Winterwood Way, Houston, Tex. 77029)
Filed June 17, 1970, Ser. No. 46,981
Int. Cl. A23g 3/00
U.S. Cl. 107—1 A
10 Claims

ABSTRACT OF THE DISCLOSURE

A work receiving board reciprocates below an oscillatable feed turret to receive a ribbon strip of dough and filling in either direction of movement of the board while folding one edge of the dough over the filling prior to tilting of the board during a dwell thereof for rolling the dough into a continuous roll and cutting of the latter into uniform lengths of edibles; the programming of the above operations in timed relation to one another according to variations of the edibles to be produced on the apparatus.

BACKGROUND

This invention relates to apparatus for fabricating food and more particularly to edibles of the type in which fillings are confined within dough-like wrappings or overlays.

Numerous devices have already been developed for feeding meats and the like onto a wrapping medium such as "Cellophane" (Ramsey Pat. No. 2,226,442 dated Dec. 24, 1940). There are also devices for making raviolis and like edibles in which chopped meats are applied as a filling between two layers of dough and later cut into squares (Pieretti Pat. No. 1,843,626 dated Feb. 2, 1932). Still others teach the folding of dough over a filling by the use of flipper mechanisms (Archer Pat. No. 3,190,240 dated Mar. 19, 1968). The patent to Manspeaker Pat. No. 3,354,842 dated Nov. 28, 1967 relates to the idea of laying a strip dough on a conveyor below a dispenser for laying pie filling onto the dough and then a covering or layer of dough. Each of these prior known devices is specific to some particular form of edible.

THE PRESENT INVENTION

The present invention has as one object to provide in a food fabricator means for reciprocating a work receiving board from side to side of a centrally located turret having towers of edible material adapted to be fed onto the reciprocal board in timed relation therewith and means for automatically reversing the turret at the end of each phase of operation of the work receiving board.

It is another object to provide means for programming the food fabricator through various modes of timed operation dependent upon the type of edible to be fabricated. In this connection it should be understood that the apparatus embodying the present invention is adaptable for the manufacture of such edibles as tamales, ravioles, eggrolls, jelly rolls, turnovers, pizza rolls, won-tons, empanadeas, cappallettes, meat pies, and the like.

The present invention has its embodiment in apparatus for laying a uniform width ribbon strip of dough on the work receiving board; overlaying the ribbon strip with a preformed charge of filler; folding one edge of the ribbon strip over the filler; rolling the same into a continuous roll of edible; and cutting the continuous roll into uniform lengths thereof. It is another object to provide in such an apparatus, means for alternately repeating the foregoing operation from one to the other side of a centrally located feeding station and means for automatically controlling the alternating operation in timed relation with the reciprocation of the work receiving board from side to side of such central feeding station.

In connection with the foregoing it is an object of the present invention to provide a plurality of feed towers on the feed turret for feeding various forms of edible matter onto the work receiving board in sequence preparatory to the production of a complete edible.

It is another object to provide means for tilting the work receiving board during a dwell thereof into an inclined position such as to cause the ribbon strips of material to gravitate therefrom. In this connection it is a further object to automatically cut the ribbon strips of edible material, if continuous, into uniform finger lengths.

It is another object of this invention to provide means operatively associated with the reciprocating work receiving board for partially folding the ribbon strip of dough over the filling thereon such that upon tilting of the work receiving board, the partially folded ribbon strip of dough and filling will roll off the inclined board in the form of a continuous roll of edible.

It is another object to provide various types of feed throats on the feed towers such as to control the size and width of the edible material discharging therefrom onto the work receiving board to produce different forms of edibles thereon.

These and other objects and advantages of the present invention will become apparent from a reading of the following description and claims in the light of the accompanying five sheets of drawing in which:

FIG. 1 is a front elevational view of a food fabricating apparatus embodying the present invention;

FIG. 2 is an end view of FIG. 1 as seen from the right-hand end thereof;

FIG. 3 is a partial plan view of FIG. 1 taken from line 3—3 thereof;

FIG. 4 is a transverse section through a turret and food material feed tower of FIG. 3 taken substantially along line 4—4 thereof and at slightly larger scale with respect thereto;

FIG. 5 is an enlarged bottom plan view of the feed throat of one feed tower;

FIG. 6 is section through FIG. 5;

FIG. 7 is a bottom plan of the feed throat of another feed tower;

FIG. 8 is a section through FIG. 7;

FIG. 9 is a fragmentary section through FIG. 8 taken along line 9—9 therein;

FIG. 10 is a partial side elevation of FIG. 4 as seen from line 10—10 thereof;

FIG. 11 is an enlarged detail of a program alternating switch actuating means as taken along line 11 in FIG. 2;

FIG. 12 is an enlarged fragmentary perspective view of the feed throats of the feed towers and a material turning feature;

FIG. 13 is a section through FIG. 12 taken along line 13—13 therein;

FIG. 14 is a section through FIG. 12 taken along line 14—14 therein;

FIG. 15 is a fragmentary cross section through the apparatus of FIG. 1 taken substantially along line 15—15 therein;

FIG. 16 is a view similar to that of FIG. 15 with a discharging apparatus upended.

FIG. 17 is a fragmentary perspective view showing another form of food product produceable on the present apparatus;

FIG. 18 is a cross section through FIG. 17;

FIG. 19 is a fragmentary perspective view of the product segmenting feature at the discharge end of the apparatus as depicted in FIG. 16;

FIG. 20 is a schematic wiring diagram of the electrical and mechanical controls embodied in the apparatus of FIGS. 1 through 19.

GENERAL DESCRIPTION

Referring to FIGS. 1, 2 and 3 of the drawing, the apparatus generally designated 21 comprises an elongated frame 22 upon which a movable platform or carriage 23, about half the length of the conveyor frame, is supported at counter height. The movable carriage 23 is arranged on the frame for reciprocation to and fro beneath a feed station 24 located midway the ends of the frame 22. The apparatus 21 further includes means 25 for reciprocating the carriage 23 in timed relation with operation with a feed turret 26 at the feed station 24 by which edible material is applied to the carriage 23. In combination therewith the apparatus also includes a material discharge 27 which functions in the formation of the edible material in timed relation with a reversal of the feed turret 26 preparatory to reciprocation of the now empty carriage 23 back to the opposite end of the frame 22 for a repeat performance of the formation of an edible on the opposite side of the apparatus.

DETAILED DESCRIPTION

The frame 22 comprises a substantially firm, stationary table-like frame which may be constructed of metal legs 28 united by cross bars 29 for supporting a conveyor track 30 adjacent the upper level of such frame. The conveyor track 30 consists of a pair of side plates 31–31' running the full length of the elongated frame 22 and having a plurality of rollers 32 mounted on the inner faces of such side plates 31–31' to support the movable platform or carriage 23 thereon. The rollers 32 which are preferably made of "Teflon" are mounted directly across from each other on ball bearinged studs secured to the side plates. Moreover, the rollers 32 are preferably provided with flanges 32' tapering toward the load supporting inwardly extending portions of the rollers to thereby maintain the movable carriage 23 centrally of the side plates 31–31' (FIG. 3). As best seen in FIG. 4 the movable carriage 23 of the conveyor is of a width such that its side edges align with the line of connection of the tapered flanges 32' with the load bearing portion of the rollers 32.

The drive means 25 for the conveyor 21 best illustrated in FIG. 1 comprises a reversible bed motor 33 mounted on the lower portion of the conveyor frame 22 midway between the ends thereof and a cable 34 drivingly connected to the motor and trained about a series of pulleys 35 strategically journaled on the frame such that the ends of the cable can be secured to the respective ends of the movable carriage 23. Dependent upon the direction of rotation of the bed motor 33 to pull the cable 34 the carriage 23 is caused to move lengthwise over the conveyor rollers 32 from end to end of the track 30.

The movable carriage 23 has a work receiving board 36 supported thereon for movement therewith and to receive edible material E from the feed turret 26 at the feed station 24 as the board 36 is moved to and fro therebeneath.

The feed turret 26 comprises a turntable 37 mounted on the frame 22 midway between the ends of the latter. This turntable 37 has a base built on the order of a lazy suzan as best seen in FIG. 4. The base of the turntable 37 has a stationary plate 38 mounted on the frame 22 supporting an annular ball bearing ring 39 upon which a top plate 40 supports a pulley 41 concentrically thereof and having a grooved periphery 42 for a belt 43 drivingly trained about a pulley 44 on a reversible motor 45 secured to the frame 22 (FIGS. 1 and 3.).

The top plate 40 of the feed turret 26 has a plurality of feed towers 46 mounted thereon (FIGS. 1 and 3). Since one such tower is for feeding a paste or dough substance it is designated 46d whereas the other tower being for a filling such as meat and the like, it is designated 46f. These towers being identical like reference numerals apply to their identical respects, FIG. 4 showing one at larger scale.

Each feed tower 46 comprises a cylinder 47 having a feed nozzle 48 removably secured to its lower end in a conventional manner. The cylinder 47 has its upper end slidably inserted in a cap 49 secured to and supported on a pair of side straps or legs 50 having their lower ends secured to the top plate 40 of the turntable 37. The lower end of the cylinder 47 is supported on the side straps 50 by a pair of pins 51 on the open upper rim of the feed nozzle 48. These pins 51 are diametrically opposite each other and extend through slots 52 formed in the respective side straps 50 as shown in FIGS. 4 and 10. These slots 52 are of inverted L form with a recess at the toe of the L to seat the pins 51 in raised position and maintain the upper end of the cylinder 47 within the cap 49. To reload the cylinder 47 and/or to remove and replace the nozzle 48, the entire cylinder and nozzle assembly is raised and the pins 51 shifted to the vertical legs of the slots 52 such that the upper end of the cylinder comes out of the cap 49 for tilting about the axis of the pins 51 as they rest in the lower extremities of the slots 52.

Each of the feed towers 46 has a screw fed piston 53 associated therewith for pressing the contents of the cylinder 47 out through the nozzle 48. The piston 53 is keyed against turning within the cylinder 47 and has a threaded rod 54 drivingly connected to a threaded boss 55 which rotates with a large gear 56. The gear 56 is journaled in a frame 57 at the upper end of the side straps 50. A reversible motor 58 is supported on the frame 57 and has pinion gear 59 drivingly meshing with the large gear 56 for advancing or withdrawing the threaded rod 54 down and up relative to the frame 57.

The number of feed towers 46 to be employed is dependent upon the particular type of edible to be manufactured in the apparatus 21. Assuming the edible to be of the tamale type only one layer of dough is required to receive a layer of filling. In that case only two towers 46d and 46f are required in the feed station 24. The two towers 46d and 46f are placed diametrically opposite each other on the turret 26 and in alignment with the path of travel of the movable carriage 23.

Upon starting of the machine by a switch 60 in the main circuit (FIG. 20) the reversible motor 33 turns in a direction to pull the cable 34 in a direction to draw the movable carriage 23 beneath and past the feed station 24. As illustrated in FIGS. 1 and 3 the carriage 23 being to the left of the feed station the cable is pulled from left to right at table level. Thus the work receiving board 36 supported on the carriage 23 is moved from left to right beneath the feed station 24.

As best seen in FIGS, 1, 2, 3 and 20 a series of program control switches P.C. are mounted on the frame 22. These switches P.C. are micro switches having an actuator thereof disposed for engagement by a detent carried by the movable carriage 23 for sequential operation. There are two sets of the P.C. switches, one set R adapted for operation by the carriage 23 moving to the right and the other set L for operation by the carriage 23 moving from right to left. In their sequence of operation these P.C. switches are labeled R1 to R9 during right hand movement of the carriage 23 and L1 to L9 during lefthand movement of the carriage 23.

After the leading, righthand, end of the board 36 passes beneath the feed station 24 a detent 61 mounted on the movable carriage 23 for movement therewith engages a first program control switch R1. This operates a holding relay R1 in circuit with the reversible motor 58d on the dough feed tower 46d. This advances the screw rod 54 and piston 53 therein downwardly to force dough d out at the nozzle 48d as exemplified at the lefthand in FIG. 12. The nozzle 48d for the dough feed is of the narrow slit type as illustrated in FIGS. 7 and 8. The edible fed from the nozzle 48d is a continuous ribbon strip of dough of uniform width laid midway the side edges of the work receiving board 36.

The feed tower 46f for the filling is next set in operation in the same manner as the detent 61 on the carriage touches another program switch R3 in the circuit. This P.C. switch R3 establishes circuit to a relay R3 in circuit with the reversible motor 58f on the filling feed tower 46f. The filling discharges from the nozzle 48f having a circular spout as best seen in FIGS. 5 and 6. The filling f is discharged downt he middle of the ribbon strip of dough d previously laid upon the work receiving board 36.

The feeding of the dough and filling continues as the carriage 23 progresses until the detent 61 on the carriage engages a P.C. switch R4 on the righthand side of the frame 22. This is a stop switch which is in circuit with the holding relay R1 to release it and thereby cut off circuit to the motor 58d on the dough feed tower 46d. This stops the flow of dough d onto the board 36 just prior to the arrival of the trailing, left, end of the board beneath the nozzle 48d of the feed station. Immediately after shut down of the dough feed tower 46d the detent 61 on the carriage 23 engages another stop switch R6. This P.C. switch R6 is in circuit with the holding relay R3 to release the same and thereby stop circuit to the motor 58f on the filling feed tower 46f. Thus a strip of dough with filling thereon has been fed automatically onto substantially the entire length of the work receiving board 36.

As the carriage 23 progresses toward the right, the detent 61 next engages P.C. switch R7 which sets up circuit to a holding relay T7 by which circuit to the motor M of a timer 63 is established. The motor M drives a drum 64 having a plurality of bands B thereon numbered 1 through 9 (FIG. 20). This timer 63 controls the sequence of operation of the various componenst in the circuit.

As the timer 63 begins its operation the carriage 23 continues moving (to the right) whereupon the detent 61R is a part of an actuator (FIG. 11) as is a detent 61L 22. The detent 61R is thereby swung downwardly about the axis of a pivot mount 66 (see FIG. 11). The detent 61R is a part of an actuator (FIG. 11) as is a detent 61L alternately positioned to engage the program switches P.C. on the frame. The detent 61L is likewise but inversely pivoted as at 66' to the board 23. The detents 61R and 61L are linked by a rod 67 such that the detent 61L is swung up out of inoperative position into actuating position above the carriage 23 preparatory for the next cycle of operation of the latter from right to left in the frame 22. By this time the carriage 23 will have reached its limit of movement to the right at which time a fixed knob 68 on the carriage 23 engages and closes P.C. switch R8 and the right end edge of the carriage 23 engages and closes P.C. switch R9.

The program control switch R8 establishes circuit to a holding relay R8 for the switches R and L thereon to the bed motor 33. The bed motor 33, however, does not operate during a dwell period of the movable carriage 23 as established by the timer control device 63. This dwell period occurs during the first ten seconds of each cycle of operation. Consequently as the carriage 23 arrived at the end of its movement to close P.C. switch R9, the latter establishes circuit to the holding relay T9 for the turret motor 45. This turns the turret 26, 180 degrees to position the dough feed tower 46d in first to discharge arrangement relative to the lefthand end of the movable carriage preparatory to the next cycle of operation of the bed motor 33 in a reverse direction.

In the case of a roll type edible such as a tamale the strip of dough is folded over upon the filling immediately after the filling is applied as illustrated in FIG. 12. This fold is accomplished by the provision of a shoe 62 attached to the frame 22 within the zone of the turret 26. The arrangement is such that as the carriage 23 and board 36 with the dough and filling thereon moves past the shoe 62, one edge e of the dough is turned up initially as in FIG. 13 until it ultimately folds over the roll of filling as depicted in FIG. 14. It will therefore be appreciated that in the making of a roll type edible the entire length of dough and filling on the board is partially folded as illustrated in FIG. 14 by the time the carriage 23 reaches its full stroke.

On the timer 63 band 1 controls the operation of the timer motor M through one cycle. Band 2 controls an electrically operated air valve V1 controlling fluid flow to an hydraulic ram H1 (FIGS. 1, 15 and 16) for discharging the edible from the work receiving board 36'. The hydraulic ram H1 has one end pivotally mounted of the turret 26 and another pair 75'-76', att he right ated with a dumper. For this reason the ram H1 has its movable rod 71 pivotally connected as at 72 to one end of a dog-leg lever 73. The lever 73 is secured to a shaft 74 journaled on the front side of the frame 22 for rocking movement. A pair of arms 75-76 are secured to the shaft 74 and extend rearwardly the frame 22 beyond the respective ends of the movable carriage 23. Two such pairs of arms are provided, one pair 75-76 at the left side of the turret 26 and another pair 75'-76', at the right side of the turret 26.

In either case, when the movable carriage 23 reaches its full stroke to the right or the left of the feed turret 26, the valve V1 to the hydraulic ram H1 is opened to operate the dumper by tilting the work receiving board 36 from the position of FIG. 15 to that of FIG. 16. The arms 75-76 are disposed beyond the ends of the carriage 23 and engaged beneath the ends of the work receiving board 36 which extend slightly beyond the carriage 23. The board 36 only is thus tilted to an angular position as shown in FIG. 16 and held back by pins 77. The partially rolled edible (FIG. 14) on the board 36, however, is free to roll down the inclined plane of board 36. Thus the edible is completely folded into a cylindrical roll along its entire length for discharge from the board 36.

Slightly after the operation of the hydraulic ram H1 by opening of the valve V1 via band 2, a relief valve V2 is operated by band 3 to re-condition the ram H1 and return it to normal position as in FIG. 15. The band 9 serves to operate the solenoid at an air valve V3 for a second hydraulic ram H2 (FIG. 16). This second ram H2 is supported in a fixed position at the inclination of the tilted work receiving board and functions as a stripper to push the edible therefrom instantly upon arrival of the board 36 in fully inclined condition as shown in FIG. 16.

As best seen in FIGS. 16 and 19 the edible discharged from the board 36 rolls down an extension 78 thereof carried by the rockable shaft 74 and the arms 75-76 or 75'-76' thereof on either side of the feed turret 26. This extension 78 has a cutting harp 79 mounted thereon with a plurality of tightly strung wires 80 spaced to cut the edible into desirable, servable lengths before they ultimately fall into a storage bin 81.

It should here be noted that the dumping ram H1 and stripping ram H2 complete their operations during the dwell of the movable carriage 23 at one or the other end of the frame 22. During this dwell the reversible motor 45 for the turntable of turret 26 is set into operation via the band B7 on the timer 63. In this manner the turntable 37 is caused to turn one-half a revolution, i.e., 180 degrees until the feed towers 46d and 46f become aligned diametrically with the path of movement of the movable carriage 23. The dough feed tower 46d is thereby first to be approached by the oncoming work receiving board 36 in either of its directions of movement.

Just prior to the end of the dwell on the timer 63 the band 5 on the drum 64 initiates circuit current to the preconditioned relay R33 for the circuit to the bed motor 33 through relay switch S33. In this manner the bed motor 33 receives current to pull the cable 34 in a direction to move the carriage 23 from right to left (FIG. 20). The program of the apparatus 21 thereby repeats itself through the next cycle of operation as the movable carriage 23 travels from the right side toward the left end of the frame (FIGS. 1, 3 and 20).

Referring now to FIGS. 12 through 14 and FIGS. 17 and 18 it will be noted that various forms of edibles may be fabricated by the apparatus 21. In this connection it will also be noted in FIGS. 1, 3 and 20 that a third feed tower 46X is adapted to be disposed between the two towers 46d and 46f diametrically arranged on the turret 26. This feed tower 46X is centrally located on the turret turntable 37 as shown in dotted lines FIGS. 1, 3 and 20 and therefore in alignment with the outer towers 46d and 46f over the path of movement of the work receiving board 36. Now by changing the feed throats 48 on the lower ends of the respective feed towers 46 a ribbon strip of dough is first layed upon the work receiving board by the feed tower 46d; next a narrower strip of filling f is laid upon the ribbon strip of dough by the center feed tower 46X via a feed throat nozzle 48f (FIG. 5); thereafter another ribbon strip of dough fed from the trailing feed tower 46f now provided with a broad slit feed throated nozzle 48d (FIG. 7). The result is continuous sandwich-like layers of dough with filling therebetween as illustrated in cross section in FIG. 18.

In the fabrication of other forms of edibles the discharge of edible material from the feed towers 46 can be sporadically controlled. Means for intermitently discharging and cutting off the feed of edible material from the feed towers 46 is basically controlled by the reversible motors 58 on the respective feed towers. In addition thereto, however, the feed throated nozzles are also provided with gate means 82 and 83 respectively for promptly cutting off the flow of edible material under the program control P.C. (FIG. 20).

The dough feeding nozzle 48d as shown in FIGS. 7, 8 and 9 has the gate means 82 operatively associated therewith. This gate means 82 comprises a half round rod 84 (FIG. 9) mounted for rotation about its axis at the slit type discharge opening in the nozzle 48d. The half round rod 84 is drivingly connected to a rotary solenoid 85 mounted outside the nozzle 48d and normally spring loaded to rock the half round rod 84 into slit closing position (dotted lines FIG. 9). The rotary solenoid 85 has electrical connection to the circuit for the reversible motor 58d such that when the latter is turned on to drive the piston 53 downwardly (FIG. 4) the solenoid 85 is simultaneously energized to rock the half round rod 84 to open slit position as shown in FIG. 9.

The filling feeding nozzle 48f as shown in FIGS. 5 and 6 has the gate means 83 operatively associated therewith. This gate means 83 comprises a flat plate 86 mounted for movement diametrically across the round open end of the nozzle 48f between open and closed position relative thereto. The flat plate 86 is reciprocated diametrically of the open end of the nozzle 48f by a solenoid 87 mounted on the outside of such nozzle 48f.

The solenoid 87 is electrically connected to the circuit for the reversible motor 58 associated with the particular feed tower 46 to which the nozzle 48f is secured. Consequently the solenoid 87 is energized simultaneously with the energization of the motor 58 to open the feed throat of the nozzle 48f.

By the provision of additional P.C. switches between the micro switches R1, 2 and 3 as well as switches L1, 2 and 3, the edible material discharged from the respective feed towers 46d, 46x and 46f may be sporadically accomplished. In this manner individual sandwish type edibles may be fed onto the work receiving board 36 in spaced relation. In that event the cutting feature illustrated in FIGS. 16 and 19 may be eliminated and the individual edibles so formed, discharge from the dwelled, inclined board 36 directly into the bin 81.

Suitable safety measures may also be provided for shutting off the operation of the motors 58 on the feed towers 46 when the supply of edible material in the latter runs out. This is accomplished by providing limit switches 88 and 88' (FIGS. 4 and 3) in the circuits to the motors 58. The limit switches 88–88' are operatively associated with projections at the upper and lower limits of movement of the respective screw rods 54 in a manner well known in the art to cut off flow of current to the motors 58 at either extreme position of the piston 53 within the tower.

Having thus described the food fabricator apparatus 21 in specific detail it will be appreciated by those skilled in the art that the same may be susceptible to variations, alterations and/or modifications without departing from the spirit or scope of my invention therein as defined in the appended claims.

What I claim as new and desire to protect by Letters Patent is:

1. Apparatus for fabricating edibles comprising:
    (1) an elongated frame;
    (2) a carriage slightly less than one half the length of and mounted on said frame for movement from end to end thereof;
    (3) means for reciprocating said carriage from one end to the other end of said frame once in each cycle of operation of said apparatus;
    (4) a work receiving board on said carriage;
    (5) a feed tower mounted on said frame midway the ends thereof;
    (6) means for feeding an edible from said feed tower onto said work receiving board during movement of said board beneath said tower;
    (7) means for limiting movement of said carriage beyond the ends of said frame and for effecting a dwell of operation of said apparatus at the end of each cycle of operation thereof;
    (8) means for discharging the edible from said work receiving board during such dwell at the end of each cycle of operation of said apparatus; and
    (9) means for reversing the operation of said apparatus for repeating the foregoing operation during movement of said carriage and work receiving board toward the opposite end of said frame.

2. The apparatus in accordance with that of claim 1 including a timer for programming each cycle of operation of the reciprocation of said carriage from one to the other end of said frame.

3. The apparatus in accordance with that of claim 2 in which said feed tower comprises:
    (1) a turret mounted for rotation centrally of and on said frame;
    (2) at least two feed towers mounted on said turret diametrically opposite each other and in alignment with the longitudinal axis of said frame for feeding a ribbon strip of dough onto said work receiving board from the first approached tower and for feeding a filling onto said ribbon strip of dough from the last approached tower; and
    (3) means for turning said turret one half revolution during the dwell at the end of each cycle of operation of said apparatus.

4. The apparatus in accordance with that of claim 3 in which said means for discharging the edible from said work receiving board comprises a dumper means on one side of said frame for tilting said work receiving board into an inclined position whereby the edible slides by gravity off one edge of said work receiving board.

5. The apparatus in accordance with that of claim 4 including a stripper means operable in timed relation with the inclination of said work receiving board during each dwell of operation of said apparatus for pushing such dough and filling from said board.

6. The apparatus in accordance with that of claim 5 in which said turret includes a third feed tower centrally located between each of said diametrically opposite towers whereby a ribbon strip of dough is first fed onto said work receiving board from the first approached feed tower; said centrally located feed tower feeding a filling onto said ribbon strip of dough; and said last approached feed tower feeding a covering strip of dough over said filling and ribbon strip of dough.

7. The apparatus in accordance with that of claim 6 including means for cutting the covered strip of dough and filling into uniform lengths of edible.

8. The apparatus in accordance with that of claim 6 in which said first approached feed tower includes a feed nozzle for intermittently discharging separate lengths of dough onto said work receiving board in spaced relation therealong; said centrally located feed tower having a feed nozzle for intermittently discharging filling centrally of each of said separate lengths of dough; and said last approached feed tower having a feed nozzle for discharging a covering layer of dough over said filling and separate length of dough on said work receiving board.

9. The apparatus in accordance with that of claim 5 including means on the side of said frame opposite said dumper means in the region of said turret for engaging one side edge of the ribbon strip of dough on said work receiving board for partially folding such one edge of the dough over the filling to thereby effect gravitation of said dough and filling as a complete continuous roll upon inclination of said work receiving board by said dumper means.

10. The apparatus in accordance with that of claim 9 including means for cutting the complete continuous roll of dough and filling into uniform lengths of edible.

References Cited
UNITED STATES PATENTS

| | | | |
|---|---|---|---|
| 2,448,786 | 9/1948 | Faxon | 107—1 A X |
| 2,764,106 | 9/1956 | Maickel | 107—1 A |
| 3,190,240 | 6/1965 | Archer et al. | 107—1 R |
| 3,354,842 | 11/1967 | Manspeaker | 107—1 J |

RICHARD J. SCANLAN, JR., Primary Examiner